(12) United States Patent
Moeller et al.

(10) Patent No.: US 10,862,536 B2
(45) Date of Patent: Dec. 8, 2020

(54) SYSTEM AND METHOD FOR POSITION CORRECTION USING POWER LINE CARRIER COMMUNICATIONS

(71) Applicant: Valmont Industries, Inc., Omaha, NE (US)

(72) Inventors: Mark Moeller, Valley, NE (US); Tracy A. Thatcher, Gretna, NE (US)

(73) Assignee: Valmont Industries, Inc., Omaha, NE (US)

( * ) Notice: Subject to any disclaimer, the term of this patent is extended or adjusted under 35 U.S.C. 154(b) by 0 days.

(21) Appl. No.: 16/546,466

(22) Filed: Aug. 21, 2019

(65) Prior Publication Data

US 2020/0076470 A1    Mar. 5, 2020

Related U.S. Application Data

(60) Provisional application No. 62/723,663, filed on Aug. 28, 2018.

(51) Int. Cl.
  *H04B 3/54*       (2006.01)
  *H04L 12/40*      (2006.01)
  (Continued)

(52) U.S. Cl.
  CPC .......... *H04B 3/546* (2013.01); *A01G 25/092* (2013.01); *A01G 25/16* (2013.01); *B05B 12/06* (2013.01);
  (Continued)

(58) Field of Classification Search
  CPC ...... A01G 25/09; A01G 25/092; A01G 25/16; A01G 25/165; A01G 27/003; B05B 3/18;
  (Continued)

(56) References Cited

U.S. PATENT DOCUMENTS 4,190,068 A    2/1980    Beusch et al.
8,948,979 B2   2/2015    Malsam
  (Continued)

*Primary Examiner* — Young T. Tse
(74) *Attorney, Agent, or Firm* — Milligan PC LLO

(57) ABSTRACT

The present invention provides a method for aligning spans using real-time kinetics (RTK) data communicated through a power line carrier system. According to a further preferred embodiment, the method of present invention includes the steps of: receiving a first set of GPS location data and second set of RTK data; comparing the first set of GPS location data with the second set of RTK data; calculating RTK error correction data; creating an RTK error correction data signal containing RTK error correction data; modulating the RTK error correction data signal for transmission on a power line carrier; transmitting the RTK error correction data signal through a power line BUS onto a power line to a last drive tower; de-modulating the RTK error correction data signal; calculating the location of the last drive tower using the RTK error correction data; calculating a straight, center line between the pivot and the last drive unit; calculating the relative distances between each intermediate drive tower and the calculated center line; and controlling the speed or average run time of each intermediate drive tower to reduce distance between their current locations and the calculated center line.

22 Claims, 7 Drawing Sheets

(51) Int. Cl.
*G01S 19/43* (2010.01)
*A01G 25/16* (2006.01)
*G01S 19/51* (2010.01)
*B05B 12/06* (2006.01)
*A01G 25/09* (2006.01)
*B05B 12/12* (2006.01)

(52) U.S. Cl.
CPC ............ *B05B 12/124* (2013.01); *G01S 19/43* (2013.01); *G01S 19/51* (2013.01); *H04L 12/40045* (2013.01)

(58) Field of Classification Search
CPC ....... B05B 12/06; B05B 12/124; G01S 19/42; G01S 19/421; G01S 19/428; G01S 19/43; G01S 19/51; H04B 3/54; H04B 3/546; H04L 12/40039; H04L 12/40045

USPC ........ 375/219, 220, 257, 259; 239/723, 728, 239/731, 733; 455/40
See application file for complete search history.

(56) References Cited

U.S. PATENT DOCUMENTS

| | | | |
|---|---|---|---|
| 2007/0267524 A1* | 11/2007 | Mack | A01G 25/092 239/729 |
| 2015/0081120 A1 | 3/2015 | Pfrenger | |
| 2016/0309667 A1* | 10/2016 | Kreikemeier | A01G 25/09 |
| 2017/0295730 A1* | 10/2017 | Abts | A01G 25/092 |
| 2017/0349060 A1* | 12/2017 | Abts | B60L 15/20 |
| 2018/0348714 A1* | 12/2018 | Larue | G05B 13/0265 |
| 2019/0021245 A1* | 1/2019 | Thatcher | A01G 25/09 |
| 2019/0037786 A1* | 2/2019 | Fischman | A01G 25/092 |
| 2019/0235091 A1* | 8/2019 | Thatcher | A01G 25/092 |
| 2020/0127492 A1* | 4/2020 | Moeller | A01G 25/16 |

\* cited by examiner

SYSTEM AND METHOD FOR POSITION CORRECTION USING POWER LINE CARRIER COMMUNICATIONS

RELATED APPLICATIONS

The present application claims priority to U.S. Provisional Application No. 62/723,663 filed Aug. 28, 2018.

BACKGROUND AND FIELD OF THE PRESENT INVENTION

Field of the Present Invention

The present invention relates generally to a system and method for providing correction and position signals to various powered elements within an irrigation machine to achieve a variety of objectives, including alignment control of irrigation spans, guidance of irrigation machines (e.g. corners and linears) and to provide positional information to a variety of remote monitoring and control devices.

Background of the Invention

Modern center pivot and linear irrigation systems generally include interconnected spans (e.g., irrigation spans) supported by one or more tower structures to support the conduits (e.g., water pipe sections). In turn, the conduits are further attached to sprinkler/nozzle systems which spray water (or other applicants) in a desired pattern. In these modern irrigation systems, a significant number of powered elements are used to control various aspects of irrigation. These often include a variety of sensors, sprayers, drive control systems, motors and transducers.

In the past, irrigation machines have utilized a variety of approaches to communicate data between system processors. These approaches have included dedicated hard-wired systems (e.g. RS485, TCP/IP, RS232, etc.) and wireless systems (e.g. cellular, Wi-Fi, VHF/UHF radios, spread spectrum radios and the like). Both of these solutions are costly and prone to communication errors. Hard-wired systems require the installation of significant lengths cable and wireless systems often require repeater stations to boost the radio signals over long distances. Further, wireless systems have poor reliability due to distance, weather changes, obstacles, induced RF noise and long latencies, particularly with cellular communications. Both systems have caused errors in position reporting and have caused system delays due to failed communications. The end result of these errors has been poor water application uniformity, delays in application and other problems which have reduced yields and profitability for growers.

To overcome the limitations of the prior art, a reliable and effective communication and control system is needed to control and align irrigation spans and drive towers within a mechanized irrigation system. Further, a system is needed to provide guidance to steerable elements of the irrigation machine and to provide locational awareness of the machine (positional information) to a machine control system and to remote operators.

SUMMARY OF THE PRESENT INVENTION

To address the shortcomings presented in the prior art, the present invention provides a system for providing improved communications and locational awareness within an irrigation system having at least one span and a drive system for moving the spans.

According to a first preferred embodiment, the present invention includes a method for communicating Global Positioning System (GPS) location data throughout an irrigation system having a plurality of connected spans and a plurality of drive towers for moving the connected span around a center pivot having a pivot controller.

According to a second preferred embodiment, the present invention includes a method for communicating GPS Real Time Kinematic (RTK) correction signal data throughout an irrigation system having a plurality of connected spans and a plurality of drive towers for moving the connected span around a center pivot having a pivot controller.

According to a further preferred embodiment, the system of the present invention preferably further includes a fixed RTK reference station which calculates GPS location errors and transmits the error correction data using modulated signals transmitted through a power line carrier (PLC) system to one or more downstream GPS units providing guidance to an irrigation machine such as the said roving GPS unit.

According to a further preferred embodiment, a method of present invention includes the steps of: at a fixed (reference) station, receiving a first set of GPS location data and second set of RTK data; comparing the first set of GPS location data with the second set of RTK data; calculating RTK error correction data; creating an RTK error correction data signal containing RTK error correction data; modulating the RTK error correction data signal for transmission on a power line carrier; broadcasting the RTK error correction data signal through a power line BUS onto a power line to a last drive tower; at a mobile (rover) station, receiving said error correction data signal through a power line BUS; de-modulating the RTK error correction data signal; calculating the location of the mobile station using the RTK error correction data According to a further preferred embodiment, a last regular drive unit (LRDU) or corner drive tower may preferably include a GPS receiving unit which preferably acts as a mobile (rover) GPS unit providing a guidance signal to the corner drive tower or LRDU.

According to a further preferred embodiment, the error correction data transmitted to the downstream mobile (rover) GPS units at each drive unite may also be used to maintain alignment of the irrigation machine components (e.g. irrigation spans)

According to a further preferred embodiment, alignment may be maintained by calculating a straight, center line between the pivot and the last regular drive unit; calculating the relative distances between each intermediate drive tower and the calculated center line; and controlling the speed or average run time of each intermediate drive tower to reduce distance between their current locations and the calculated center line.

According to a further preferred embodiment, the GPS units of the present invention may preferably further transmit GPS location data (including Wide Area Augmentation System corrected data) to a central control panel, typically located at the center pivot point or linear cart. According to a further preferred embodiment, the location data of the present invention may preferably be utilized for a variety of applications, such as turning the end-gun sprinkler on or off as a center pivot moves through areas of the field where water beyond the end of the structure is, or is not, required; transmitting irrigation machine location to the cloud for remote monitoring and control of said machine, such as reporting of location of machine within the field; and for a variety of other needs, both locally at the irrigation machine or remotely (in the cloud or for a remote operator).

According to a further preferred embodiment, a method of present invention may include the steps of: receiving a first set of GPS location data; modulating the GPS location data signal for transmission on a power line carrier; broadcasting the GPS location data signal through a power line BUS onto a power line to a plurality of drive towers and a central control unit; de-modulating the GPS location data signal at each drive tower and central control unit and making said GPS location data available for use at said drive towers and central control unit.

According to a further preferred embodiment, all GPS units on the PLC system may transmit their locational data for use by other GPS units for a variety of reasons, such as comparing relative positions between spans, calculation of relative angles between spans, relative elevations between drive units and the rates of change of said angles and elevations and the like.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
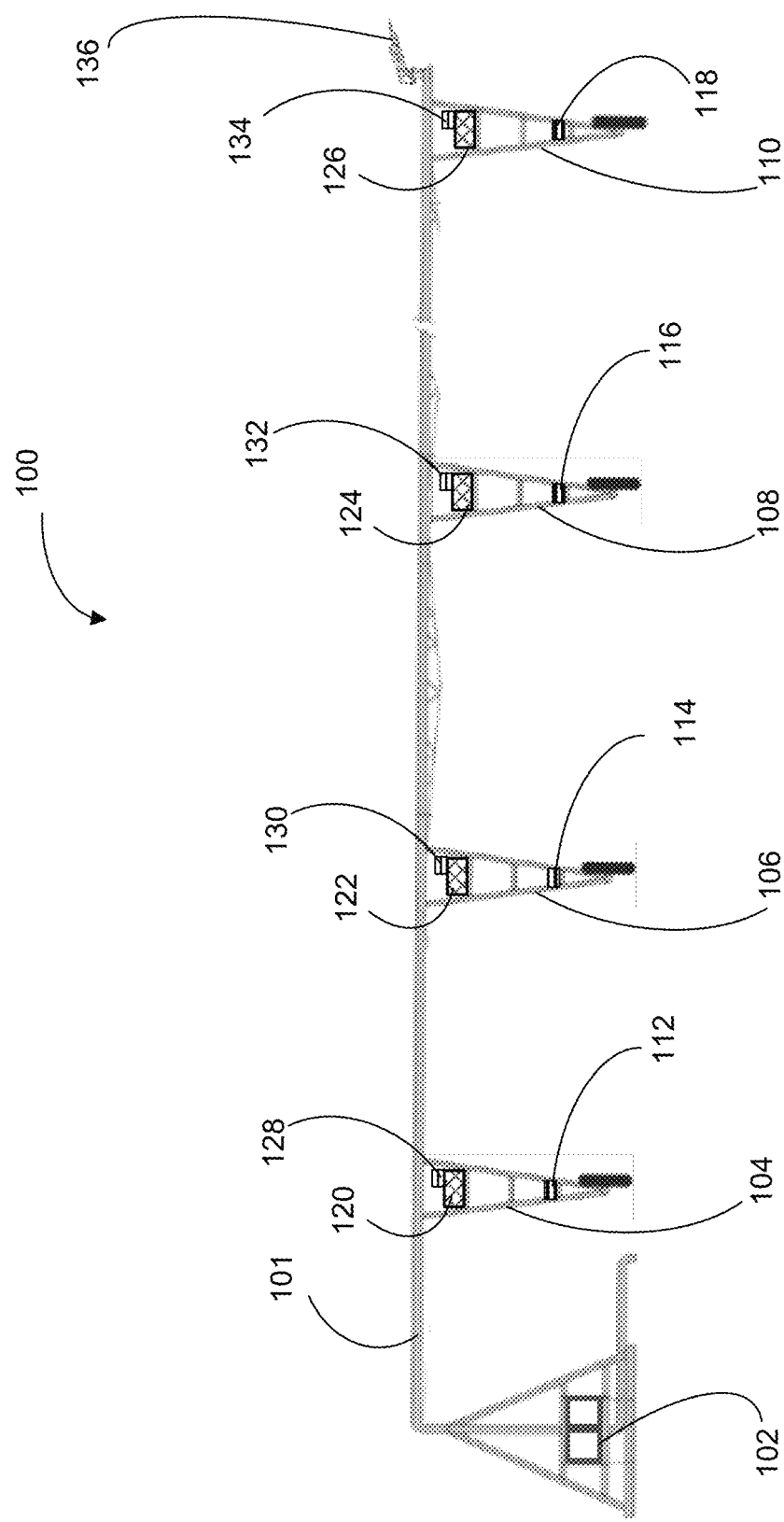
FIG. 1 shows an exemplary irrigation system for use with the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

In accordance with preferred embodiments of the present invention, it should be understood that the term "drive unit" may preferably include a number of sub-components including: a motor, a controller, a communication device (such as a PLC or the like) and an alignment device. Further, while the invention is discussed below with respect to four exemplary towers, the number of towers used may be expanded or reduced (i.e. 1-100 towers) as needed without departing from the spirit of the present invention. Further, the term "motor" as used herein may refer to any suitable motor for providing torque to a drive wheel. Accordingly, the term "motor" as used herein may preferably include motors such as switch reluctance motors, induction motors and the like.

The terms "program," "computer program," "software application," "module," "firmware" and the like as used herein, are defined as a sequence of instructions designed for execution on a computer system. The term "solid state" should be understood to refer to a range of solid state electronic devices which preferably include circuits or devices built from solid materials and in which the electrons, or other charge carriers, are confined entirely within the solid material. Exemplary solid-state components/materials may include crystalline, polycrystalline and amorphous solids, electrical conductors and semiconductors. Common solid-state devices may include transistors, microprocessor chips, and RAM.

A program, computer program, module or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods includes: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types. Of course, the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structure), bidirectional triode thyristors (TRIAC), mixed analog and digital, and the like.

As shown in FIG. 1, the exemplary system 100 shown includes a span 101 which preferably includes a series of connected span sections which may be pressurized to facilitate the transfer of water from a water source through the irrigation system 100. The fluid source may be coupled to a repository or other source of agricultural products to inject fertilizers, pesticides, and/or other chemicals into the fluids to create an applicant for application during irrigation. Thus, the applicant may be water, fertilizer, herbicide, pesticide, combinations thereof, or the like. The exemplary system 100 may further include a main control panel 102 which may control transducers, sensors and valves (not shown) to control and regulate water pressure to sprinklers (not shown) including an end gun 136 and other sprinkler heads (not shown).

As further shown, the system may include drive towers 104, 106, 108, 110 having respective tower control boxes 120, 122, 124, 126. As further shown, these tower control boxes may be interfaced with respective alignment sensors 128, 130, 132, 134 and control respective drive unit motors 112, 114, 116, 118. As discussed above, the system of the present invention may include any motor suitable for providing torque to a drive wheel or wheels. According to a preferred embodiment, the system of the present invention may preferably include motors such as switch reluctance motors, induction motors and the like.

Figure 2:
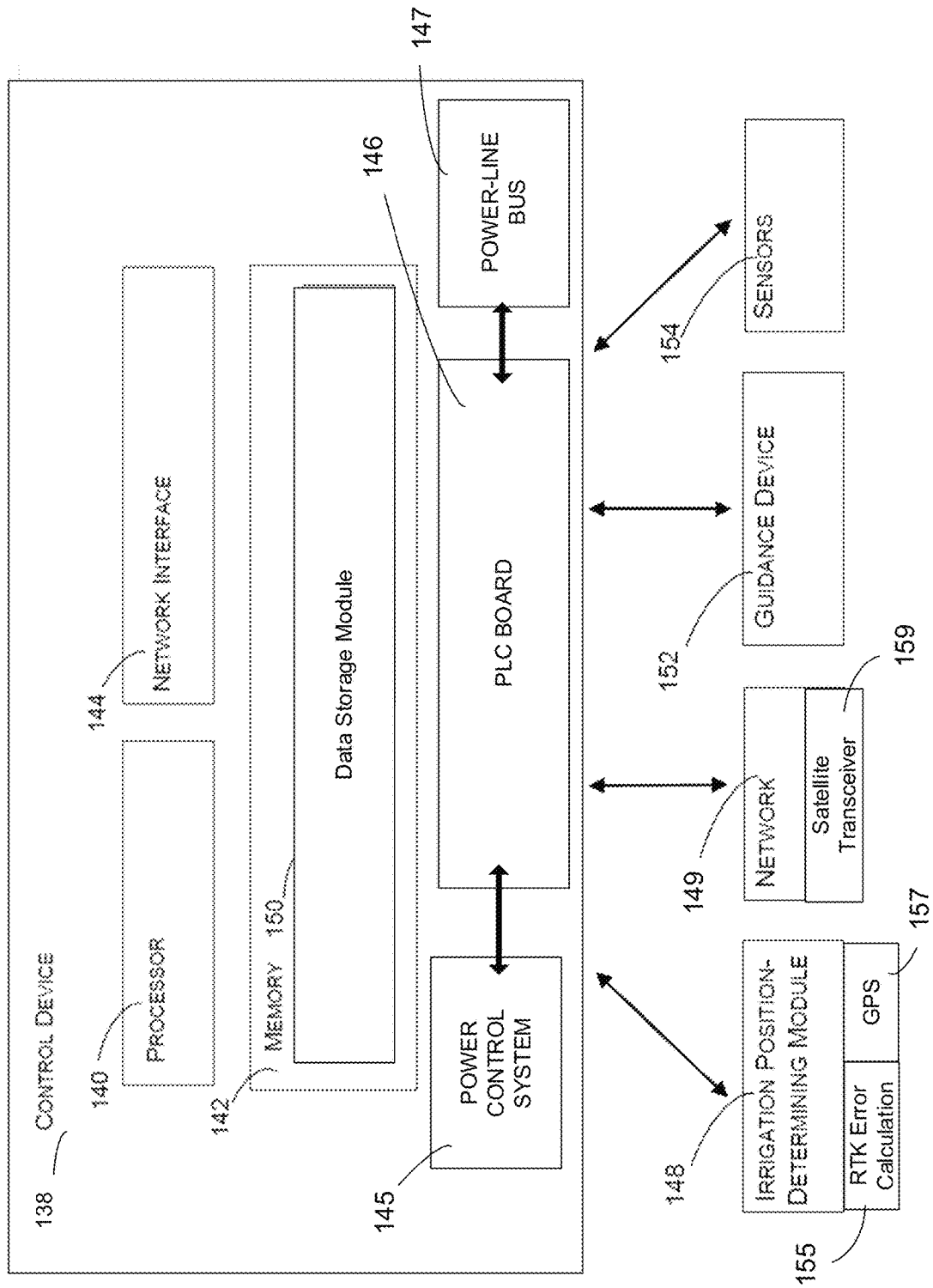
FIG. 2 shows a block diagram illustrating the exemplary processing architecture of a control device in according with a first preferred embodiment of the present invention.

With reference now to FIG. 2, an exemplary control device 138 which represents functionality to control one or more operational aspects of the irrigation system 100 will now be discussed. As shown, an exemplary control device 138 preferably includes a processor 140, a memory 142, a data storage module 150 and a network interface 144. The processor 140 provides processing functionality for the control device 138 and may include any number of processors, micro-controllers, or other processing systems. The processor 140 may execute one or more software programs that implement techniques described herein. The memory 142 is an example of tangible computer-readable media that provides storage functionality to store various data associated with the operation of the control device 138, such as the software program and code segments mentioned above, or other data to instruct the processor 140 and other elements of the control device 138 to perform the steps described herein. The memory 142 may include, for example, removable and non-removable memory elements such as RAM, ROM, Flash (e.g., SD Card, mini-SD card, micro-SD Card), magnetic, optical, USB memory devices, and so forth. The network interface 144 provides functionality to enable the control device 138 to communicate with one or more networks 149 through a variety of components such as wireless access points, transceivers and so forth, and any associated software employed by these components (e.g., drivers, configuration software, and so on). As shown, a preferred system of the present invention may include a satellite transceiver 159 or the like for receiving direct satellite communications.

In implementations, exemplary control device 138 preferably further includes a power control system 145, a power line control (PLC) board 146 and a power-line BUS 147. According to a preferred embodiment of the present invention, the power-line BUS 147 preferably may include conductive transmission lines, circuits and the like for controlling and routing electric power, controlling its quality, and controlling the devices attached to a power-line carrier system as discussed further below. According to further preferred embodiments, the PLC board 146 preferably routes and converts power and data signals which are transmitted through the power-line BUS 147 as discussed further below.

Further, the system of the present invention preferably may further include an irrigation position-determining module 148 which may further include a global positioning system (GPS) receiver 157 or the like to calculate a location of the irrigation system 100. In accordance with a further preferred embodiment of the present invention, the irrigation position determining module 148 preferably further includes a real-time kinematics (RTK) Error Calculation Module 155 as discussed further below. According to preferred embodiments, the processing of RTK signals as discussed herein may preferably be conducted using a single frequency or dual frequencies without limitation.

As further shown, control device 138 may be coupled to a guidance device or similar system 152 of the irrigation system 100 (e.g., steering assembly or steering mechanism) to control movement of the irrigation system 100 and to assist in controlling the movement and locational awareness of the system. Further, the control device 138 may preferably further include multiple inputs and outputs to receive data from sensors 154 and monitoring devices as discussed further below.

According to a preferred embodiment, the RTK Error Calculation Module 155 preferably functions to perform RTK error calculations to enhance the precision of position data derived from the GPS system 157. Although the present invention is discussed with respect to GPS, the present invention applies to data received from other positioning systems such as LORAN, GLONASS, Galileo, BeiDou and the like, as well as any combination of those like systems. Additionally, RTK can utilize a single frequency (commonly known as the L1 band) for corrections or can utilize dual frequencies (commonly known as the L1 and L2 bands). Further like correction technologies (such as WAAS, or Differential GPS) that enhance positional accuracy may be used. Preferably, any such systems would be compatible with the like positioning systems discussed above and provide positional accuracy better than 1 meter.

Figure 3:
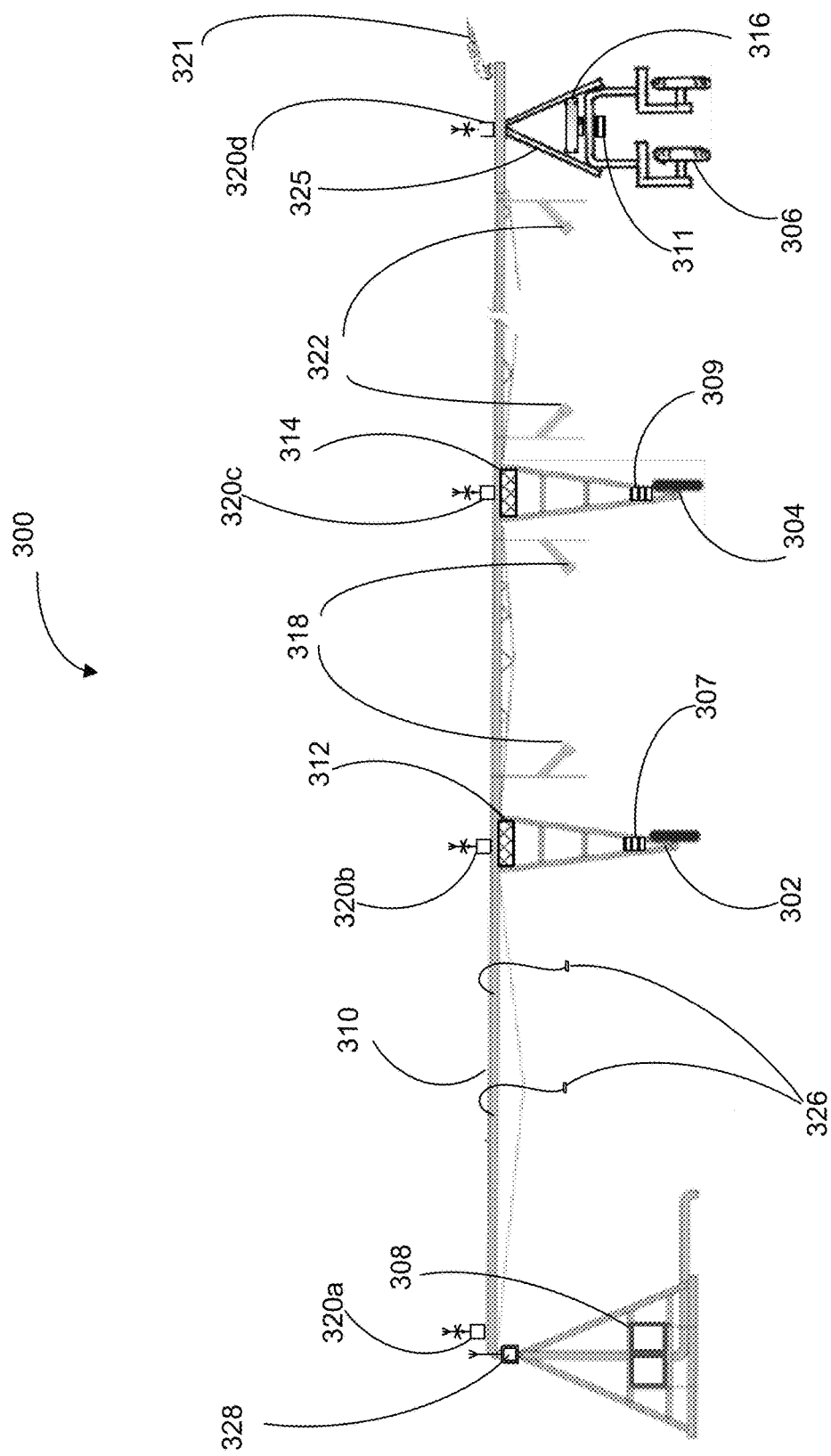
FIG. 3 shows an irrigation system in accordance with further preferred embodiment of the present invention.

With reference now to FIG. 3, an exemplary system 300 incorporating aspects of the present invention shall now be further discussed. As further shown, an exemplary irrigation system 300 may include transducers (not shown) which are provided to control and regulate water pressure to sprinklers including the end gun 321 and other sprinkler heads 326.

Further the system may preferably include solid state tower boxes 312, 314, 316 (including the PLC boards, solid-state motor controllers, non-contact alignment devices and other components as discussed above and further with respect to FIG. 4 below) which are preferably interconnected to respective drive unit motors 307, 309, 311. As further shown, the respective drive unit motors 307, 309, 311 preferably provide torque and braking to respective sets of drive wheels 302, 304, 306. As discussed above, the system of the present invention may include any suitable motor for providing torque to a drive wheel. According to a preferred embodiment, the system of the present invention may preferably include motors such switch reluctance motors, induction motors and the like.

Further, the system 300 of the present invention may preferably further include a control/pivot panel 308 as well as elements such as a GPS receivers 320*a-d* for receiving positional data. Still further, a system of the present invention may further include indirect crop sensors 318, 322 which preferably may include optional moisture sensors to determine the moisture levels in a given area of soil. Additionally, the sensors 318, 322 may further include optics to allow for the detection of crop type, stage of grown, health, presence of disease, rate of growth and the like. Still further, the system may include ground sensors. Still further, the detection system may further receive data from a connected or remote weather station or the like which is able to measure weather features such as humidity, wind speed, wind direction, pressure, precipitation, temperature and the like. Further, the preferred system of the present invention may alternatively further include additional elements mounted to the span 310 such as additional sensors and the like.

As further shown in FIG. 3 and as discussed further below, a preferred system of the present invention may further include a Real Time Kinematic (RTK) reference station 328 for providing error correction data to a GPS roving receiver which may be attached to a corner drive tower 325 or the like as discussed further below. Preferably, the RTK reference station 328 is positioned on a very accurately surveyed point. Still further, the RTK reference station 328 preferably receives GPS signals and calculates error correction data based on the location differences between the surveyed location and the location data indicated by the measured GPS signals. According to a further preferred embodiment, a last regular drive unit (LRDU), corner drive tower or cart may preferably include a GPS receiving unit 320*d* which preferably acts as a roving GPS unit.

Figure 4:
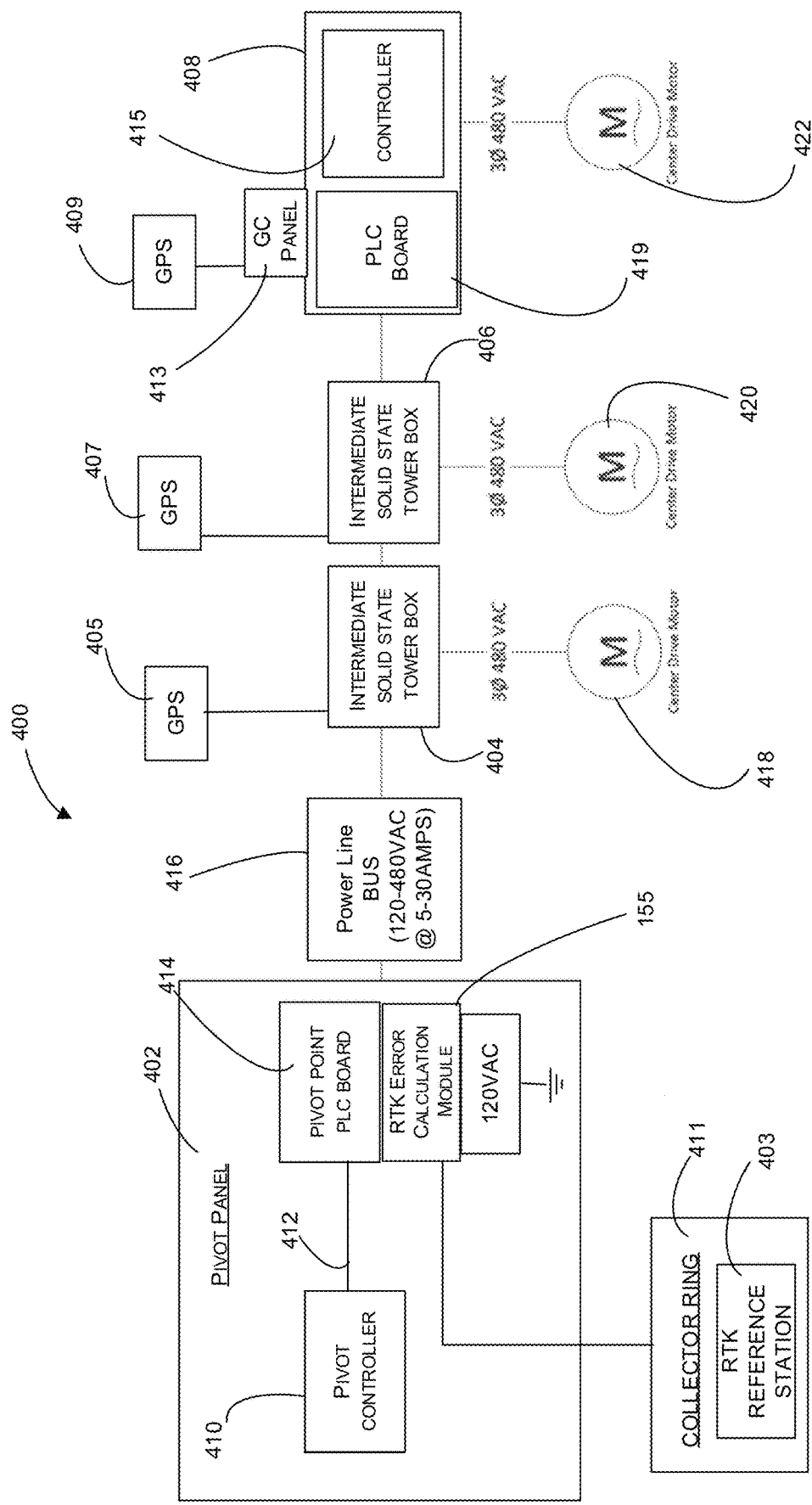
FIG. 4 shows a block diagram in accordance with further preferred embodiment of the present invention.

With reference now to FIG. 4, once the RTK reference station 403 (alone and/or in combination with the pivot controller 410 and the RTK Error Calculation Module 155), creates error correction data, the error correction data is then preferably transmitted by the pivot controller 410 as an error correction data signal to the pivot point PLC board 414. The pivot point PLC board 414 then preferably modulates the error correction data signal and transmits the signal through the power line BUS 416 and PLC system to one or more downstream GPS units/controllers 405, 407, 409. In this way, each receiving GPS unit/controller of the present invention receives enhanced RTK guidance. According to a further preferred embodiment, the GPS units/controllers 405, 407, 409 of the present invention may further transmit GPS location data to the pivot controller 410 to provide additional locational awareness.

According to a further preferred embodiment, the RTK reference station 403 may preferably be located within a collector ring/slip ring device 411 attached to the center pivot point. According to alternative preferred embodiments, the location (longitude, latitude) of the RTK reference station may be set by any method known in the art. For example, the RTK reference station location may be manually set by user input from data gathered outside the system. Alternatively, the RTK reference station location may be set via a "survey mode" where the location of the unit is determined using known algorithms to time-average GPS positional data gathered by the receiver.

With further reference now to FIG. 4, the power/control system of the present invention 400 may preferably include a control/pivot panel box 402 which preferably provides control signals and power to a series of intermediate solid-state tower boxes 404, 406 and a last regular drive unit (LRDU)/cart/rover tower box 408. As shown, each solid-state tower box 404, 406, 408 preferably further includes a GPS sensor/input 405, 407, 409. It should be understood that solid-state tower boxes are provided as an example and the present invention is not intended to be limited to the use of solid-state tower boxes. For example, electro-mechanical tower boxes may be used with the PLC system of the present invention in place of the solid-state tower boxes without departing from the scope of the present invention.

As further shown, the control/pivot panel box 402 of the present invention may preferably include a main pivot controller 410 connected to a pivot point PLC board 414 which controls and directs power to downstream intermediate solid-state tower boxes 404, 406 and corner drive tower/cart/rover tower box 408. According to a preferred embodiment, the pivot controller 410 may be directly wired to the pivot point PLC board 414 or connected via a serial communication connection 412 (i.e. RS-232) or the like. According to preferred embodiments, the pivot panel box 402 preferably provides power and control signals through the pivot point PLC board 414 to the downstream solid-state tower boxes 404, 406, 408 via a power-line BUS 416.

According to preferred embodiments, the power-line BUS 416 of the present invention may provide and direct power at any of a variety of different voltages and amps. For example, the power-line BUS 416 of the present invention may provide power over a range of voltages (such as between 0-1000 volts) and over a range of currents (such as 0.1 to 100 amps) as desired without limitation. According to a further preferred embodiment, the power may be provided at 120-480 volts with a current anywhere between 5-50 amps. For instance, the power-line BUS 416 may provide 120 volts AC at 5 amps. According to a further preferred embodiment, the power-line BUS 416 may preferably provide power at 480 volts AC at 30 amps. According to a further preferred embodiment, the power-line carrier of present invention may preferably operate as a one or two-way system.

As further shown in FIG. 4, the RTK data is preferably first received by the RTK reference station 403 which may be located within a collector ring 411 attached to the riser. Thereafter, the data is provided to the RTK Error Calculation Module 155 to calculate and produce GPS error correction data. Thereafter, the RTK Error Calculation module 155 preferably transmits the RTK error correction data to the pivot point PLC board 414 where the signal is modulated and transmitted (along with power and control signals provided by the power-line box 416) to the downstream solid-state tower boxes 404, 406, 408 and pivot controller 410 via a power-line BUS 416.

Figure 7:
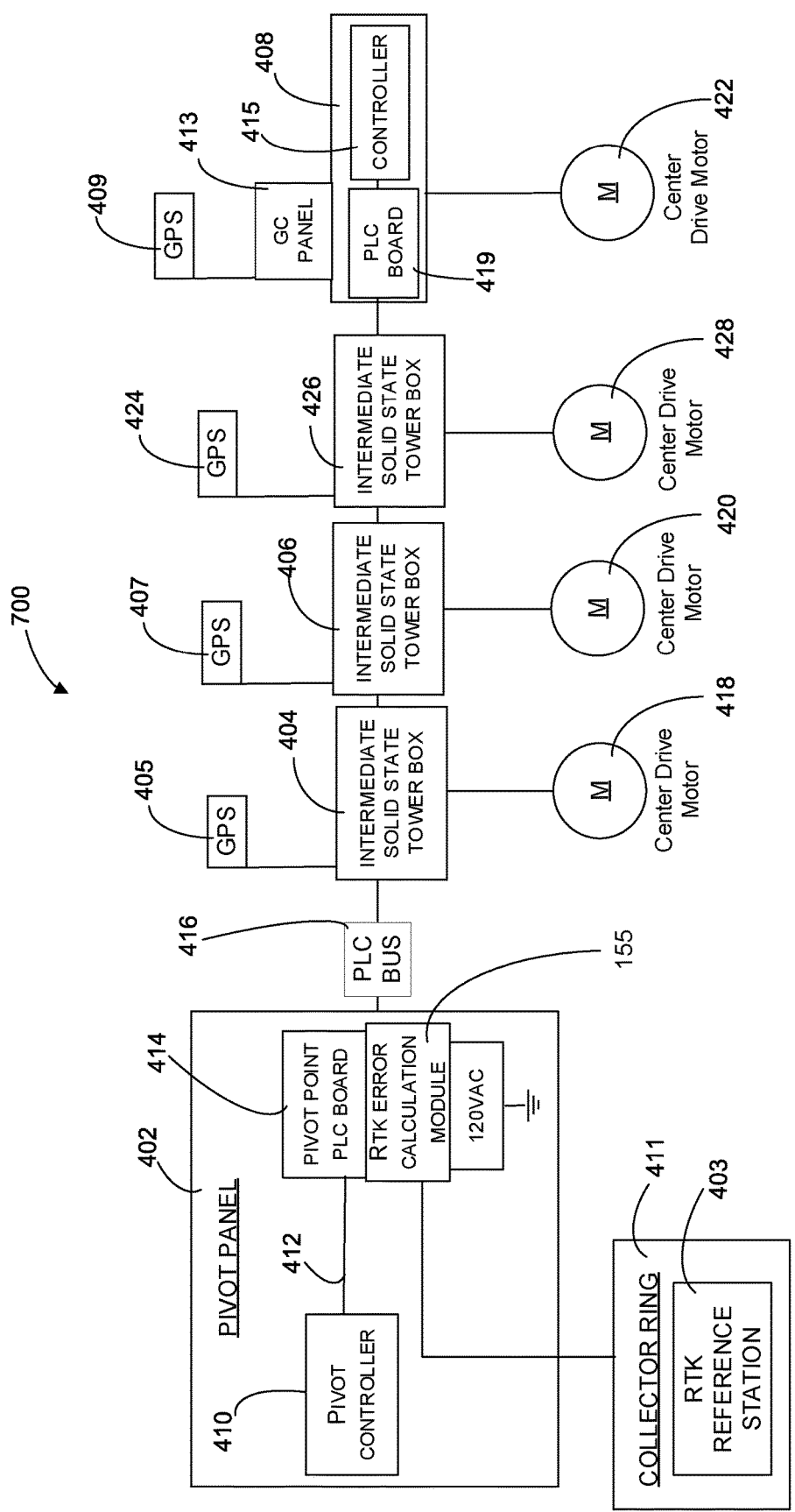
FIG. 7 shows a block diagram illustrating a further alternative embodiment of the present invention.

The error correction data signal is preferably first received by a first intermediate solid-state tower box 404 which preferably receives, processes and thereafter directs the received power to a center drive motor 418. Further, the RTK error correction data is preferably further processed by the intermediate solid-state tower box 404 and used to correct/adjust the GPS location data received from the GPS module 405. Thereafter, the power and control signals may be further transmitted to one or more downstream tower boxes 406 which likewise process the received signals and direct power to their respective drive motors 420. Although not shown, any number of additional intermediate solid-state our boxes may be incorporated as needed depending on the size of the irrigation system. For example, FIG. 7 shows a block diagram of an alternative embodiment 700 which includes a third solid-state tower box 426 which is linked to a GPS module 424 and a center drive motor 428.

Regardless of the number of intermediate solid-state tower boxes, the RTK error correction data and the power from the power-line bus 416 are preferably finally received at a corner drive tower box 408 which preferably likewise receives and processes the received RTK error correction data as well as directs the received power to a center drive motor 422.

As further shown in FIG. 4, the corner drive tower box 408 may preferably further include a GPS guidance control (GC) panel 413 for receiving and processing guidance control signals. Still further, the corner drive tower box 408 may preferably further include a PLC board 419 for receiving/transmitting and translating control and power signals between the tower box control panel 415 and the other systems communicating through the power-line BUS 416 as discussed further below. Further, each tower box 404, 406 may preferably further include similar PLC boards (not shown) to provide similar functions.

In operation, the GC system 413 mounted on the end of the irrigation machine may preferably receive signals from GPS satellites via a GPS sensor 409 or the like and calculate the position of the unit. As discussed above, such calculations may include data from a Wide Area Augmentation System (WAAS) or the like. This data may then be transmitted to the PLC board 419 via a conventional wired connection of any type (including being integrated onto the same circuit board as the GPS receiver). Thereafter, the PLC board 419 may then preferably transmit the GPS position data to the pivot point PLC board 414 which may demodulate and send the signals to the main pivot controller 410 where the data may be used to indicate the position (i.e. distance, compass angle etc.) of the irrigation machine relative to the pivot point. The pivot controller 410 may then further report the position data via a communications system to a cloud-based remote monitoring and control system to allow a remote operator to know the position of the irrigation machine within the field. Further, the pivot controller 410 may use the positional data to activate or deactivate auxiliary sprinklers based on the location of the irrigation machine. Still further, the pivot controller 410 may use the positional data to adjust the speed of the machine and/or pulsing rate of sprinklers to comply with a variable rate irrigation prescription as discussed further below. Still further, the pivot controller 410 may use the positional data to make further calculations such as calculating slip rate or the like to detect a stuck machine.

Figure 5:
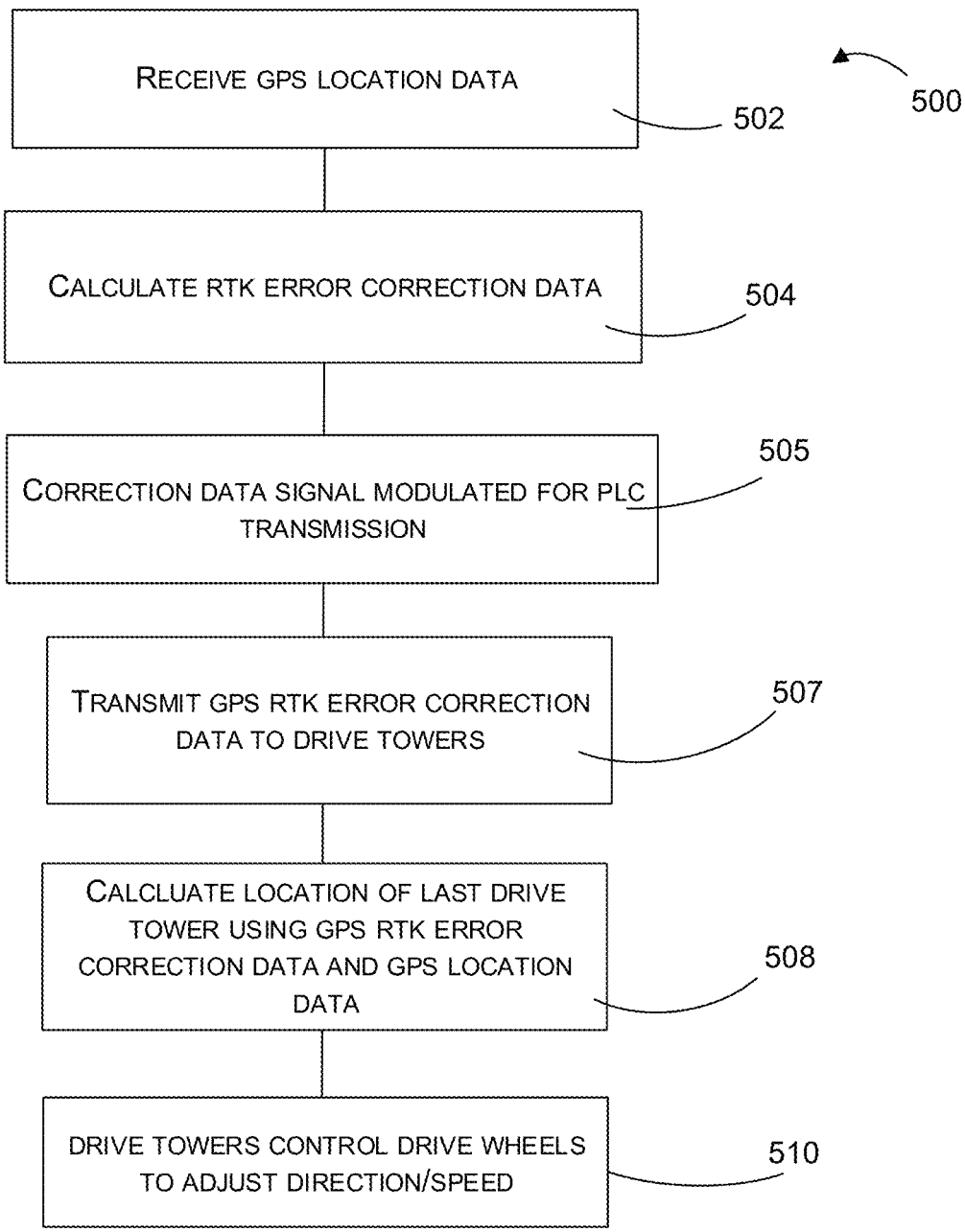
FIG. 5 shows a flow chart illustrating an exemplary method in accordance with a first preferred embodiment of the present invention.

With reference now to FIGS. 4 and 5, a preferred method 500 in accordance with preferred embodiments of the present invention shall now be discussed. According to a first preferred embodiment, at a first step 502, GPS position data are preferably first received by the fixed (reference) station 403. Alternatively, this data may be input from memory or received from an outside network. According to a preferred embodiment, the GPS data are compared to the reference geographic location stored in the fixed (reference) station. Thereafter, at a next step 504, stored geographic data and GPS data are then preferably processed by the RTK Error Calculation Module 155 of the PLC board 414 to create RTK error correction data. At a next step 505, the pivot point PLC board 414 then preferably modulates the error correction data into a data signal that can be transmitted through the power line BUS 416.

At a next step 507, the RTK error correction data is preferably transmitted to each downstream drive tower controller 404, 406, and 408. Preferably, the data signals are transmitted through the power-line BUS 416 to one or more receiving PLC boards within the downstream tower boxes 404, 406, 408. According to a preferred embodiment, an LRDU PLC board 419 may receive the correction data and demodulate the received data signal. Thereafter, the PLC board 419 may preferably forward the correction data to the corner drive tower box controller 415 and/or GC panel 413 to use in location refinement and other calculations. According to a preferred embodiment, the frequency of the corrected data transmission may be once per second. Alternatively, the corrected data may be transmitted at faster or slower intervals.

At a next step 508, the location of the corner drive tower 408 may preferably be calculated using GPS data and RTK error correction data. At a next step 510, the corner drive tower 408 may preferably calculate distance adjustments (preferably using a deviation error or path projection algorithm or the like) and make adjustments to drive speed and/or directions to correct the drive tower location relative to the prescribed drive tower location. For example, the controllers for each drive tower may control their drive wheels to reduce distance between their current locations and a desired guidance path. This may preferably be accomplished by adjusting the duty cycle of a start-stop motor, by increasing or reducing the RPM (revolutions per minute) of a variable speed motor (such as a switch reluctance motor or an induction motor driven by a variable frequency drive) or by like methods.

According to an alternative preferred embodiment, each individual drive tower may increase or reduce its speed to reduce the distance between itself and a center line calculated between the pivot point to the last drive tower in order to maintain substantially straight alignment of the non-corner irrigation spans. Preferably, any such the calculations and/or adjustments by the drive towers of the present invention may be continually performed in real time to maintain alignment during irrigation. Additionally, the RTK correction signal may preferably be sent out in real-time to allow each tower controller to correct GPS errors in real-time.

According to an alternative preferred embodiment, the speed of a drive wheel may be controlled by adjusting or changing the programmed average speed of the drive wheel. The present invention may thus continually update the programmed average speed of each tower as necessary and may continually cycle between location detection and updating of programmed average speeds of each tower to minimize the misalignment of towers.

According to further preferred embodiments, the alignment algorithms of the present invention may operate when the machine is still or during the running of the irrigation system. Further, the algorithms and systems of the present invention may be used to initially align the towers every time the machine is started (i.e., at the beginning of the machine movement) rather than during machine movement. According to a further preferred embodiment, the algorithm of the present invention may preferably include a margin error so that only towers located more than a set distance (i.e. two inches) from a given centerline are instructed to reduce detected alignment errors. According to a further preferred embodiment, the order of alignment may be determined in the order of the outermost tower to the innermost tower. Further, the instructions for realigning the towers may be prioritized from the outermost tower to the innermost tower.

Figure 6:
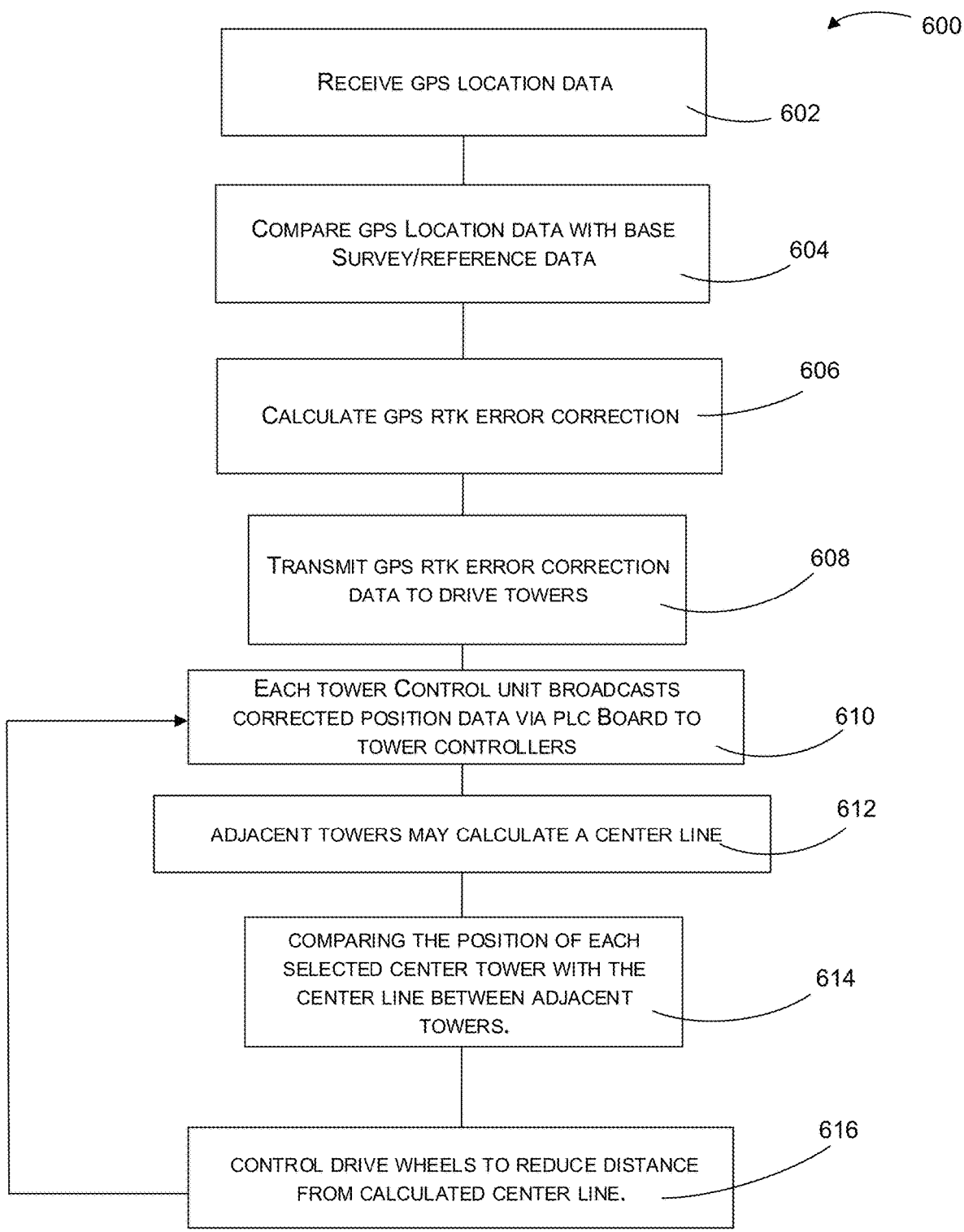
FIG. 6 provides a flow chart illustrating an exemplary method in accordance with an alternative embodiment of the present invention.

With reference now to FIGS. 4 and 6, an alternative alignment method 600 for use with the present invention shall now be discussed. According to an exemplary alternative algorithm, at a preferred first step 602, the pivot controller 410 of the present invention preferably receives a first set of GPS location data. According to a preferred embodiment, the GPS data may be received directly by GPS satellite receivers. Alternatively, this data may be input from memory or received from an outside network.

At a next step 604, the pivot controller 410 preferably compares the GPS location data with the reference geographic location stored in the fixed (reference) station. At a next step 606, the pivot controller 410 preferably calculates RTK error correction data. At a next step 608, the RTK error correction data is preferably transmitted to each downstream drive tower controller 404, 406, 408 via the power line carrier network.

At next step 610, each tower control unit may preferably broadcast corrected position data to adjacent drive tower controllers. According to a preferred embodiment, each tower control unit may transmit corrected position data via a connected PLC board. According to alternative preferred embodiments, the corrected position data may be transmitted directly between drive tower controllers or may first be transmitted to the central pivot point controller 410 which may then store and transmit location data to each drive controller through the PLC BUS 416. At a next step 612, each pair of adjacent towers may preferably calculate a straight, center line between themselves using the corrected position data. At a next step 614, the drive towers may calculate their relative distances to the calculated center line. At a next step 616, the controller for each drive tower may then control a set of drive wheels to reduce distance between their current location and the calculated center line. For example, a motor may preferably be controlled to increase its speed so that the distance between itself and the center line is reduced while the irrigation machine travels in a given direction thus reducing the angular offset between drive towers.

Preferably, multiple groups of towers may act simultaneously to align themselves and to continually updated center lines. For example, the system may preferably analyze and align multiple three tower groups at the same time. Further, the "three-tower alignment" may preferably be run at every tower along the machine, beginning with the tower closest to the end tower and proceeding inward. The alignment may preferably be run simultaneously amongst all the towers. Additionally, the pivot controller 410 may preferably continually send out real-time kinematics (RTK) signals to all of the downstream towers to allow each tower controller to correct GPS errors and calculate correction location data.

According to a further preferred embodiment, all the towers may be continuously aligned until all the "delta" lengths are within a certain threshold for alignment. During the alignment process, the end tower may preferably be moving to minimize stress on the span. According to further aspects of the present invention, it should be understood that the use of groups of three towers as discussed above is provided as a preferred example only. Alternatively, any other number of towers may be used as a group as well.

According to alternative embodiments, the present invention may utilize analog sensors on each tower. For example, a LORAN device could be located on each tower and the system may then, for example, utilize the three-tower alignment algorithm in conjunction with the triangulation data from the LORAN devices. Further, LORAN could also be utilized as a backup to the GPS sensors, in case the GPS sensors failed or became unavailable.

According to a further preferred embodiment, the GPS sensor of the present invention may preferably be placed as low to the ground as possible. Further, where a GPS sensor needs to be placed higher on a tower, any resulting terrain-caused tracking error may preferably be corrected or compensated for by utilizing an inclinometer and/or gyroscope sensor data for the GPS sensor at the tower. In this case, the GPS coordinates reported by the sensor may be adjusted based on the amount of tilt in the tower (due to terrain slopes) as measured by a co-mounted inclinometer and/or gyroscope sensor. Alternatively, if the GPS sensor is mounted closer to the pipe on the tower, then there is no need to compensate for terrain-induced tilt.

While the above descriptions regarding the present invention contain much specificity, these should not be construed as limitations on the scope, but rather as examples. Many other variations are possible. For example, the processing elements of the present invention by the present invention may operate on a number of different frequencies, voltages, amps and BUS configurations. Further, the communications provided with the present invention may be designed to be duplex or simplex in nature. Further, the systems of the present invention may be used with any arrangement of drive towers including both linear and center pivot systems. Further, as needs require, the processes for transmitting data to and from the present invention may be designed to be push or pull in nature. Still, further, each feature of the present invention may be made to be remotely activated and accessed from distant monitoring stations. Accordingly, data may preferably be uploaded to and downloaded from the present invention as needed.

Accordingly, the scope of the present invention should be determined not by the embodiments illustrated, but by the appended claims and their legal equivalents.

What is claimed is:

1. A method of aligning spans using real-time kinetics (RTK) data communicated through a power-line carrier (PLC) system, wherein the system comprises a center pivot, a plurality of connected spans and a plurality of drive towers for moving the connected spans around the center pivot having a pivot controller; wherein each drive tower is comprised of a power-line carrier node; wherein the drive towers further include intermediate drive towers and a last regular drive unit (LRDU) drive tower; wherein the intermediate drive towers comprise a first drive tower and a second drive tower; and wherein the system further comprises a fixed reference station storing reference location data; wherein the method comprises:

Receiving a first set of global positioning system (GPS) location data;

comparing the first set of GPS location data with the reference stored in the fixed reference station;

calculating RTK error correction data;

creating an RTK error correction data signal;

modulating the RTK error correction data signal for transmission on a power-line carrier (PLC); wherein the power-line carrier is comprised of a plurality of electrically conductive elements which are configured to connect and deliver signals to and from a power-line BUS;

transmitting the RTK error correction data signal through the power-line BUS onto a power line to the power-line carrier node of each drive tower;

de-modulating the RTK error correction data signal;

calculating the location of the LRDU drive tower using the RTK error correction data;

calculating a center line between the center pivot and the LRDU drive tower;

performing a distance calculation, wherein the distance calculation comprises calculating the relative distances between each intermediate drive tower and the calculated center line; wherein the distance calculation is made using a linear regression algorithm; and controlling the speed of each intermediate drive tower to reduce distance between their current locations and the calculated center line.

2. The method of claim 1, wherein the first set of GPS location data is input from memory; further wherein the speed of each intermediate drive tower is controlled by reducing the average run time of each intermediate drive tower.

3. A method of a system comprising a plurality of connected spans and a plurality of drive towers for moving the connected spans around a center pivot having a pivot controller; wherein the plurality of drive towers includes a first drive tower, a second drive tower, a last regular drive unit (LRDU) drive tower and a corner drive tower; wherein each of the plurality of drive towers comprises a tower controller and a power-line carrier node; and wherein the system further comprises a fixed reference station for storing reference location data, the method comprising:

receiving a first set of global positioning system (GPS) location data;

comparing the first set of GPS location data with the reference location data stored in the fixed reference station;

performing a first calculation, wherein the first calculation comprises calculating real-time kinetics (RTK) error correction data; wherein the RTK error correction data is calculated using at least the first set of the GPS location data and the reference location data;

creating an RTK error correction data signal, wherein the RTK error correction data signal comprises the RTK error correction data;

modulating the RTK error correction data signal for transmission on a power-line carrier; wherein the power-line carrier is comprised of a plurality of electrically conductive elements which are configured to connect and deliver signals to and from a power-line BUS via a power line;

transmitting the RTK error correction data signal through the power-line BUS onto the power line to the power-line carrier node of each drive tower;

de-modulating the RTK error correction data signal at the corner drive tower;

performing a second calculation, wherein the second calculation comprises calculating the location of the corner drive tower using the RTK error correction data;

comparing the calculated location of the corner drive tower to a target location for the corner drive tower; wherein the step of comparing comprises calculating a distance between the calculated location of the corner drive tower and the target location of the corner drive tower; wherein the distance calculation is made using a linear regression algorithm; and controlling the speed of the corner drive tower to reduce the distance between the calculated location and the target location of the corner drive tower.

4. The method of claim 3, wherein the second calculation is performed using a deviation error algorithm.

5. The method of claim 3, wherein the second calculation is performed using a path projection algorithm.

6. The method of claim 5, wherein the distance between the calculated location and the target location of the corner drive tower is reduced by adjusting the duty cycle of a start-stop motor.

7. The method of claim 6, wherein the distance between the calculated location and the target location of the corner drive tower is reduced by changing the revolutions per minute (RPM) of a variable speed motor.

8. The method of claim 7, wherein the RTK error correction data signal is transmitted in near-real-time to allow each tower controller to correct GPS errors in real-time.

9. The method of claim 8, wherein the distance between the calculated location and the target location of the corner drive tower is reduced by changing the programmed average speed of a drive tower drive wheel.

10. The method of claim 9, wherein the first drive tower is at first distance from the center pivot; wherein the second drive tower is at a second distance from the center pivot; wherein the LRDU drive tower is at a third distance from the center pivot; wherein the third distance is greater than the second distance, and the second distance is greater than the first distance; and wherein distance corrections are performed in the order of the LRDU drive tower first, the second drive tower second, and the third drive tower.

11. In an irrigation system which includes connected spans and drive towers for moving the connected spans around a center pivot having a pivot controller and an irrigation control system, the irrigation control system comprising:

a tower control panel, wherein the tower control panel comprises a first power-line carrier (PLC) board;

a real-time kinetics (RTK) reference station, wherein the RTK reference station is configured to receive RTK data; wherein the RTK reference station is located within a collector ring attached to a riser of the center pivot;

an RTK error calculation module, wherein the RTK error calculation module is configured to receive the RTK data and to produce global positioning system (GPS) error correction data; wherein the RTK error calculation module is further configured to transmit the GPS error correction data to the first PLC board;

wherein the first PLC board is configured to modulate and transmit an RTK error signal comprising the GPS error correction data; wherein the first PLC board is further configured to output power and control signals to a plurality of downstream solid-state tower boxes;

a first tower box, wherein the first tower box is a solid-state tower box configured to control the operations of a first drive tower, wherein the first tower box is configured to receive the RTK error signal, the power and control signals from the first PLC board; wherein the first tower box is further configured to direct the received power to a first tower drive motor;

a second tower box, wherein the second tower box is a solid-state tower box configured to control the operations of a second drive tower, wherein the second tower box is configured to receive the RTK error signal, the power and control signals from the first PLC board; wherein the second tower box is further configured to direct the received power to a second tower drive motor; and a corner tower box, wherein the corner tower box is a solid-state tower box configured to control the operations of a corner drive tower, wherein the corner tower box is configured to and control signals from tower box is further to a corner tower drive receive the RTK error signal, the power the first PLC board; wherein the corner tower box is further configured to direct the received power to a corner tower drive motor;

wherein the corner tower box comprises a second PLC board and a guidance control panel; wherein the second PLC board is configured to receive the power and control signals from the first PLC board; wherein the guidance control panel is configured to receive GPS sensor data and the RTK error signal; wherein the second PLC board is further configured to generate corner tower position data using the RTK error signal; and wherein the second PLC board is further configured to transmit the corner tower position data to the first PLC board.

12. The irrigation control system of claim 11, wherein the first PLC board is further configured to calculate a position of the center pivot at least in part using data from a Wide Area Augmentation System (WAAS).

13. The irrigation control system of claim 12, wherein the pivot controller is configured to transmit the corner tower position data to a remote cloud-based monitoring and control system.

14. The irrigation control system of claim 13, wherein the pivot controller is configured to use the corner tower position data to control one or more sprinklers based on the position of the irrigation system.

15. The irrigation control system of claim 14, wherein the pivot controller is configured to use the corner tower position data to adjust a first speed of the irrigation system.

16. The irrigation control system of claim 15, wherein the pivot controller is configured to use the corner tower position data to control a first pulsing rate of sprinklers to comply with a variable rate irrigation prescription.

17. The irrigation control system of claim 16, wherein the pivot controller is configured to use the corner tower position data to calculate a slippage rate of at least one drive tower.

18. The irrigation control system of claim 17, wherein the irrigation control system further comprises:
  a third tower box, wherein the third tower box is a solid-state tower box configured to control the operations of a third drive tower, wherein the third tower box is configured to receive the RTK error signal, the power and control signals from the first PLC board; and wherein the third tower box is further configured to direct the received power to a third tower drive motor;
  wherein the first, second, third and corner drive towers are configurable to transmit and receive corrected position data from one or more drive towers;
  wherein the first and second driver towers are adjacent; wherein the second and third drive towers are adjacent; and wherein the third drive tower and the corner drive tower are adjacent;
  wherein a first pair of adjacent drive towers comprises the first and second drive towers; wherein a second pair of adjacent drive towers comprises the second and third drive towers; and wherein a third pair of adjacent drive towers comprises the third drive tower and the LRDU drive tower;
  wherein each of the first, second and third pairs of drive towers is configured to independently calculate a distance to a center line between the first pair of adjacent drive towers using location data corrected using the RTK error signal; and
  wherein the first pair of adjacent towers is configured to assign only one of the first or second drive tower box to control a set of drive wheels to reduce the distance between a current location and the calculated center line.

19. The irrigation control system of claim 18, wherein the irrigation control system further comprises a plurality of alignment groups; wherein a first alignment group is comprised of a first plurality driver towers; and wherein the first alignment group is configured to coordinate the alignment of the first plurality drive towers within the first alignment group independent of instructions from the tower control panel.

20. The irrigation control system of claim 19, wherein the first alignment group is comprised of three drive towers; wherein each driver tower comprises a drive tower box; wherein the first alignment group is configured to transmit alignment data among the tower boxes within the first alignment group; and wherein the first alignment group is further configured to align each of the three drive towers along a centerline calculated by the tower boxes within the first alignment group.

21. The irrigation control system of claim 20, wherein the plurality of alignment groups is configured to align in sequence based on their distances from the center pivot.

22. The irrigation control system of claim 21, wherein alignment groups furthest from the center pivot are configured to align before alignment groups closest to the center pivot.

* * * * *